United States Patent [19]

While et al.

[11] Patent Number: 4,645,394

[45] Date of Patent: Feb. 24, 1987

[54] FASTENER APPARATUS

[75] Inventors: Donald M. While, Dallas; Edward C. Matza, Plano, both of Tex.

[73] Assignee: LTV Aerospace and Defense Company, Dallas, Tex.

[21] Appl. No.: 530,453

[22] Filed: Sep. 9, 1983

[51] Int. Cl.⁴ .............................................. F16B 39/06
[52] U.S. Cl. .................................... 411/110; 411/217; 411/221; 411/323; 411/358
[58] Field of Search ............... 411/105, 106, 107, 108, 411/110, 111, 112, 113, 213, 216, 217, 219, 220, 221, 280, 292, 321, 322, 323, 352, 356, 357, 358, 359, 363, 364, 365, 513, 514, 366, 367, 404; 403/118, 200, 407, 408

[56] References Cited

U.S. PATENT DOCUMENTS

| 267,269 | 11/1882 | Smith et al. | 411/220 X |
| 1,157,636 | 12/1874 | Roberts | 411/217 |
| 2,259,217 | 10/1941 | Stevenson | 411/217 X |
| 2,289,561 | 7/1942 | West | 411/404 |
| 2,400,348 | 5/1946 | Green | 411/110 X |
| 3,064,773 | 11/1962 | Linecker | 411/217 X |
| 3,130,765 | 4/1964 | Neuschotz | 411/108 |

FOREIGN PATENT DOCUMENTS

| 462865 | 12/1913 | France | 411/404 |
| 949733 | 2/1949 | France | 411/358 |
| 986783 | 4/1951 | France | 411/323 |

Primary Examiner—Thomas J. Holko
Attorney, Agent, or Firm—J. M. Cate; S. S. Sadacca

[57] ABSTRACT

A fastening apparatus is adapted to be inserted and removed from one side of a work piece having an opposite side which is substantially inaccessible to a worker. A first, externally threaded member is threadingly engaged with a receiving structure, and a second member is inserted within corresponding seats or grooves for interlocking the two members. In the preferred embodiment diverting seats are provided for forming the second member into locking engagement between the receiving structure and the first member. In one embodiment, seat structures are provided for engaging frangible panels or the like for high temperature applications.

3 Claims, 6 Drawing Figures

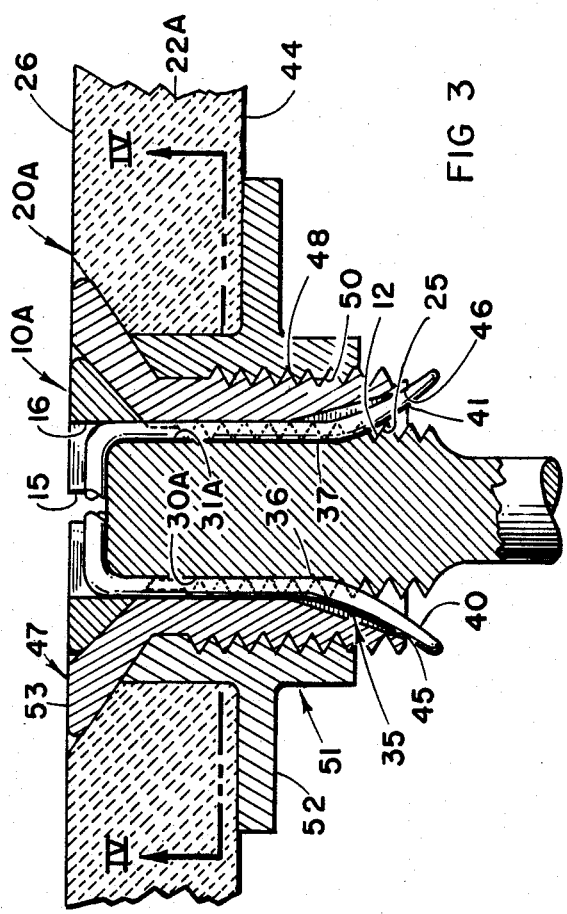
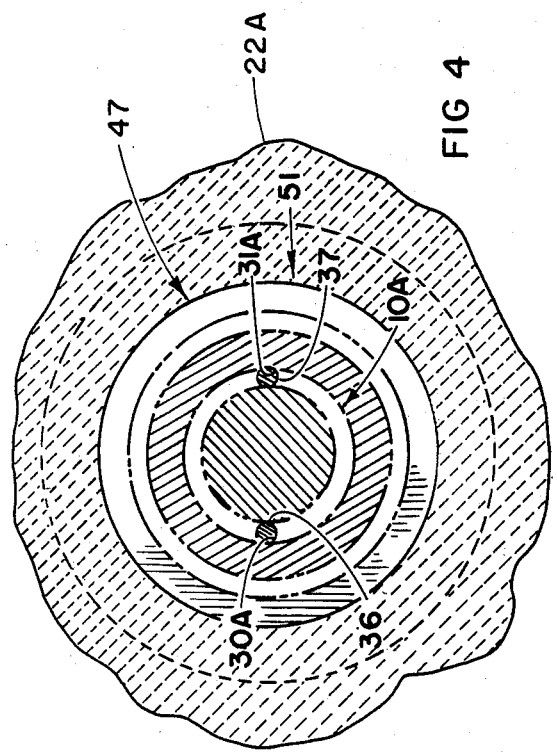
FIG 3
FIG 4
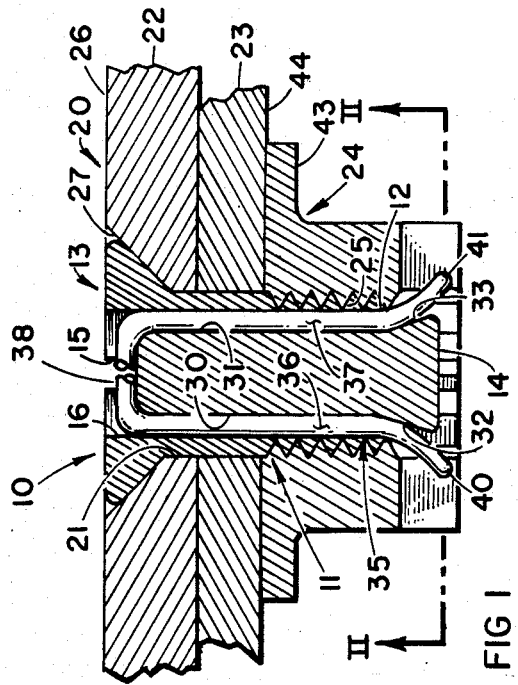
FIG 1
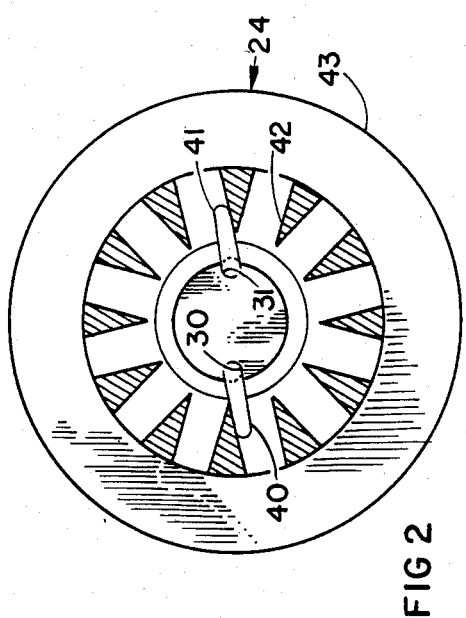
FIG 2

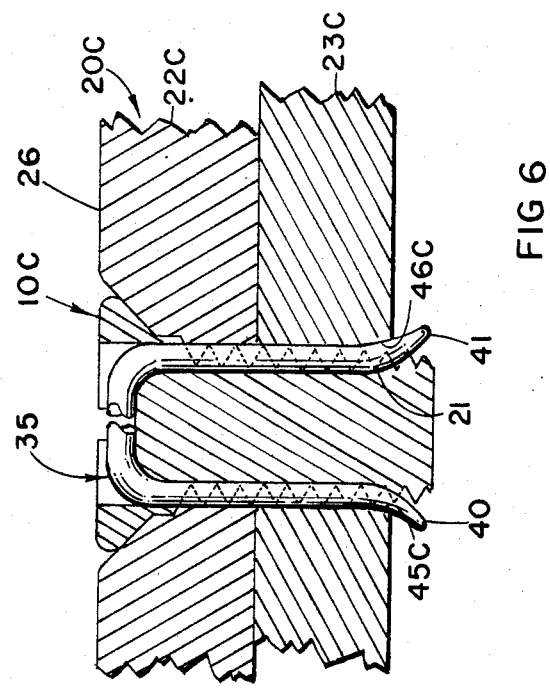
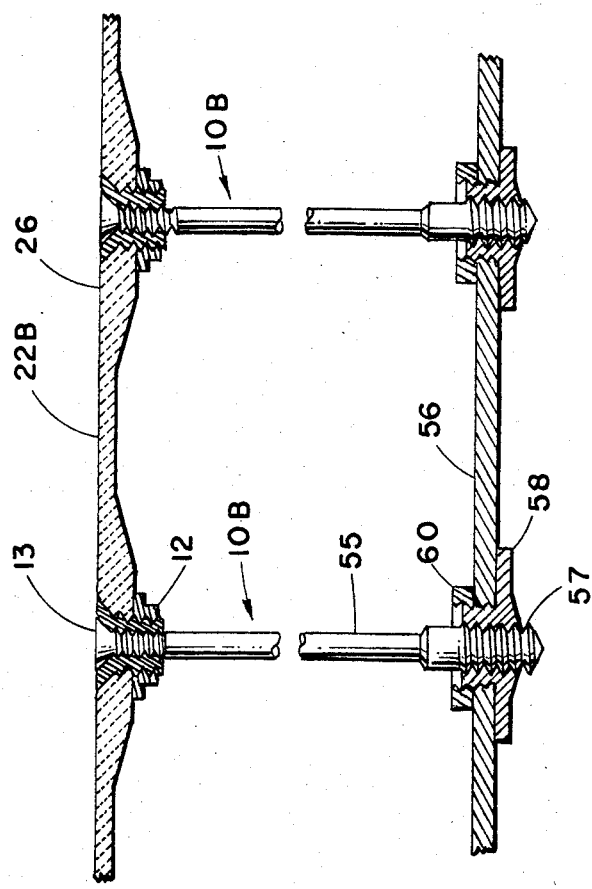

FASTENER APPARATUS

TECHNICAL FIELD

This invention relates to fastening apparatus and, more particularly, to fastening apparatus adaptable for use at elevated temperatures. This invention was made in the performance of work under NASA Contract NAS1-16951 and is subject to the provisions of Section 305 of the National Aeronautics and Space Act of 1958 [72 Stat. 435; 42 U.S.C. 2457].

BACKGROUND ART

Conventional locking fasteners have employed serrated washers, cotter pins or the like for interlocking threaded members and preventing loosening of fastener elements during vibration, thermal variations, and the like. Such devices are useful in certain applications wherein access may be conveniently obtained to both sides of a workpiece, whereby a worker may employ tools for rotatively driving a bolt or the like from one side of the workpiece while engaging a mating, locking nut or the like adjacent the opposite side of the workpiece. In applications wherein access is available only to an outer surface area of the workpiece, however, the use of lock washers, cotter pins or locking nuts is not practicable because of the difficulty of installing the members on the inaccessible or "blind" end of the bolt.

For certain applications, it has been attempted to provide blind fasteners which may be inserted and removed from an outer surface of an aircraft panel or the like. Such blind fasteners, in the past, have been secured in position by friction or by bonding, but they suffer from several inherent limitations and disadvantages. Conventional friction fasteners, for example, which are wedged into position within a bore formed within the workpiece, are readily removable but tend gradually to shift out of position during use under vibratory loads or in high temperature environments, particularly at temperatures in excess of 1600° F. Bonded or implanted fasteners are not readily removable and must often be destroyed, during removal by drilling or other destructive means. Other prior-art fastener devices have employed spring-biased locking elements. At high temperatures, however, such spring-loaded locking elements tend to relax and fail because of what is termed in the art "creep relaxation," wherein the prebiased elements tend to lose their spring bias.

Another limitation of conventional fastener devices is that their insertion and locking may themselves induce deleterious stress loads on the workpiece or panels in which they are mounted. Particularly when the fasteners are installed in structures formed of temperature resistant materials, which may tend to be more frangible than metal components, the locking action entailed in tightening the locking members tends to exert an objectionable level of stress on the workpiece, which is further aggravated by exposure to cyclical and excessively high temperatures.

OBJECTS OF THE INVENTION

It is therefore an object of the present invention to provide a new and improved fastening apparatus.

A further object of the invention is to provide an improved blind fastener which is readily insertable and removable from an exposed surface area of a workpiece.

A still further object is to provide such a fastener which does not suffer from deterioration when subjected to very high temperatures and which remains rigidly locked in place in spite of temperature variations and vibrational stresses.

Yet another object is to provide such a fastener which may be installed and removed from a frangible workpiece without damage or deleterious stress to the workpiece.

A further object is to provide such a fastener is adapted for use as a standard for positioning and rigidly supporting an outer panel or the like in spaced relation to an inner structural member.

A still further object is to provide such a stand-off, supporting member which is adjustable for varying the spacing of an outer panel from a supporting structure.

Yet another object is to provide such a fastener which is of economical, practicable manufacture.

Other objects and advantages of the invention will be apparent from the specification and claims and from the accompanying drawing illustrative of several embodiments of the invention.

BRIEF DESCRIPTION OF THE DRAWING

In the drawing:

FIG. 1 is a longitudinal sectional view of a first embodiment of the invention;

FIG. 2 is a partially sectional, end view of the fastener of FIG. 1 showing the castellated anchor nut;

FIG. 3 is a sectional view similar to FIG. 1 showing a second embodiment of the fastener;

FIG. 4 is a sectional view of the fastener of FIG. 3 taken as on line IV—IV.;

FIG. 5 is a sectional view of two of the fasteners employed in a stand-off panel arrangement and FIG. 6 is a sectional view of a third embodiment of the fastener.

DETAILED DESCRIPTION

With initial reference to FIG. 1, the fastener apparatus includes a first member 10 of generally cylindrical configuration, having a shank portion 11 having external threads 12, and having first and second end portions 13, 14. The first end portion 13 is suitably configured as a diverging head adapted to receive a driving tool. In a preferred embodiment, first and second grooves 15, 16 are preferably formed in the first end portion, extending transversely across the end portion in mutually perpendicular array, for reasons which will become apparent from the description hereinbelow.

The first member 10 is adapted to be threadingly engaged within a receiving structure 20 having a bore 21 formed therein adapted to receive the first member. In the embodiment of FIG. 1, the receiving structure 20 includes first and second panels 22, 23, restrained one upon the other by the fastener apparatus and an anchor nut 24. The anchor nut 24 has internal threads 25 adapted to engage the external threads 12 which are formed on at least a portion of the shank 11 of the first member. The first panel 22, which may typically be an exposed outer panel having an outer surface area 26, preferably includes a frusto-conical recess 27 for receiving the end portion 13 of the first member 10. When the first member 10 is to be inserted within a receiving structure 20 in which the opposite, inner surface 44 is inaccessible, it is preferred to affix the anchor nut 43 to the inner, inaccessible surface 44 prior to insertion of the first member 10. This is accomplished by means such as bonding or welding the anchor nut 43 to the surface 44 or by insertion of rivets, not shown, through bores formed through the flange 43 and the second panel 23. In other embodiments, as will be described hereinbelow, the internal threads 25 may be formed in the workpiece itself or in a member preinstalled in the workpiece.

First and second elongated, axial recessed seats or grooves 30, 31 are formed along the length of the first member 10 and extend across the threads 12. Toward the second end portion 14 of the first member, the respective inner, bottom surfaces of the first and second grooves 32, 33 diverge outwardly and thereby define outwardly diverging ramps 32, 33. The grooves 30, 31 preferably extend axially along diametrically opposite sides of the first member.

A second member 35 is provided for effecting locking association between the first member 10 and the receiving structure 20. Suitably, the second member 35 is in the form of a staple formed of a ductile metal such as a low carbon steel, having first and second legs 36, 37 and an interconnecting, medial portion 38. During installation in typical applications, the first member 10 is threadingly engaged with the anchor nut 24 and is rotatively driven within the nut by means of a suitable driving tool adapted to engage one or both of the slots 15, 16. The first and second legs 36, 37 of the second member 35 are then inserted within the grooves 30, 31, respectively, and driven inwardly toward the first member second end portion 14. Upon engaging the first and second ramps 32, 33, the distal end portions 40, 41 of the second member 35 are formed into engagement with, and preferably splayed outwardly into engagement with portions of the receiving member 20. In the embodiment of FIGS. 1 and 2, and with primary reference now to FIG. 2, the portion of the anchor nut 24 adjacent the diverging ramps 32, 33 is castellated to form a plurality of radially extending slots 42 adapted to receive the distal end portions 40, 41 of the second member 35. Upon the second member 35 being driven within the axial grooves 30, 31, distal end portions 40, 41 are thereby splayed outwardly into locking engagement with respective ones of the slots 42, whereby the first member 10 is nonrotatably engaged or locked to the anchor nut 24. As suggested above, the second member 35 is advantageously formed of a low carbon steel such as AISI 1025, of sufficient ductility to permit its outward forming against the ramps 32, 33. As seen in FIG. 2, the distal end portions 40, 41 of the second member 35 may also be rotationally deflected by the castellations as the legs 36, 37 are urged within the grooves 42, in the event the end portions 40, 41 are not in coincidence with adjacent ones of the grooves 42. For high temperature applications the second member may suitably be formed of a nickel alloy, and the first member may be of a carbonized composite. Removal of the fastener is effected by removal of the second member 35 from the grooves 30, 31 by means of a sharp tool which may be inserted, preferably within groove 15 under the medial portion 38 of the second member 35, whereby the second member may be pried outwardly from the first member 10.

Because of the effective locking relationship between the first member 10 and the receiving structure 20, it is not necessary to apply excessive torque to the first member 10 as it is rotatably driven within the receiving structure, and the first member 10 may be readily removed without damage to the panels 22, 23. Further, the anchor nut 24 is preferably provided with a flange 43 which rests against the inner surface 44 of the panel 23 and which disperses compressive loads applied to the panel members 22, 23 as the first member is tightened within the anchor nut 24. Accordingly, the fastening apparatus is particularly suited for the connection and restraint of relatively inflexible or frangible structures such as those of ceramic, plastic or composite materials. It is further particularly suited for applications in structures to be employed at varying and/or elevated temperatures, in that the distal end portions 40, 41 of the second member remain locked in place regardless of thermal effects upon the components.

As may be seen in FIGS. 1 and 2, the axially extending grooves 30, 31 are cut sufficiently deep within opposite sides of the first member shank 11 to permit insertion of the second member legs 36, 37 entirely within the internal threads 25 when the legs are inserted within the grooves 36, 37 of the first member 10. That is, the legs 36, 37 do not interfere with the internal grooves 25 of the receiving structure 20 as they are inserted, and no corresponding seats or grooves are required in the receiving structure, in the first embodiment. In the alternative embodiment shown in FIGS. 3 and 4, however, the longitudinal grooves 30A, 31A are formed coincident with and bisecting both the external and internal threads 12, 25. Accordingly, engagement of the legs 36, 37 within the longitudinal grooves 30A, 31A provides locking engagement between the two sets of threads 12 and 25, thereby constraining the first member 10A nonrotatively within the receiving structure 20A independently of any engagement of the distal end portions 40, 41. Accordingly, the castellations employed in the embodiment of FIGS. 1 and 2 are not essential in the embodiment of the FIGS. 3 and 4. It is preferred, however, that first and second indentations 45, 46 be formed in the adjacent portion of the receiving structure 20A, i.e., the portion adjacent the distal end portions 40, 41 for engaging the distal end portions. It is again preferred, that means be provided for outwardly splaying the distal end portions 40, 41, into locking engagement with the adjacent, receiving portions 45, 46 of receiving structure 20A. Such means, in the embodiment of FIGS. 3 and 4, comprise outwardly biased spring portions of the legs 36, 37 adjacent the distal end portions 40, 41 whereby the distal end portions 40, 41 are biased to deflect outwardly into engagement with the indentations 45, 46 as the second member 35A is inserted within the axial grooves 30A, 31A.

In the embodiment of FIGS. 3 and 4, the receiving structure 20A further comprises a sleeve member 47 having both internal threads 25 and external threads 48, the external threads 48 being adapted to engage corresponding internal threads 50 formed within an external grommet 51. Alternatively, the external threads 48 of the sleeve member 47, are threadingly engaged with corresponding threads (not shown) formed in the panel member 22A, whereby the sleeve member 47 is directly threadingly engaged with the first panel 22A as in the embodiment to be described, of FIG. 6. In the embodiment of FIGS. 3 and 4, the grommet member 51 is formed with a lower, diverging flange portion 52 which is adapted to seat against the internal surface area 44 of the panel member 22A for rigidly constraining the panel member 22A between the flange 52 and the head portion 53 of the sleeve member 47. The member 47A may thus be preinstalled in the workpiece to permit "blind" installation of the fastener. It should be understood that directional terminology such as "upper," "lower,"

"outer," "inner," may be used herein with reference to the orientation of the illustrated embodiments in the drawing for the sake of clarity of description only, and are not to be interpreted as inferring a limitation with respect to structural orientation of the fastener during use.

Referring to FIG. 5, the second embodiment (of FIGS. 3 and 4) is shown in a further modification in which the first member 10B is provided with an elongated lower shank portion 55 for supporting the panel member 22B in spaced relation to a lower, supporting structure 56. Two of the fastener devices 10B are shown by way of representation, but it will be understood that multiple fasteners are normally employed, spaced throughout the structure. Such applications are typical for aerospace vehicles in which the outer panel 22B is constructed of a heat resistant composite, such as a carbonized phenolic composite having graphite reinforcement fibers, for sustaining the very high temperature environments present during high speed atmospheric flight. The supporting structure 56 may suitably be a metallic structure such as a steel panel or the like. The lowermost end of the shank 55 is formed with an externally threaded portion 57 for engaging a grommet 58 which is suitably seated against one side of the supporting structure 56, a threaded locking nut 60 suitably being engaged by the threaded portion 57 adjacent the opposite surface of the structure 56. The lower, externally threaded portion 57 is of identical or lesser diameter than the external threads 12 formed on the shank portion adjacent the first end portion 13, whereby the elongated first member 10B may be readily inserted into both the panel structure 22B and the support structure 56 from the exterior side surface 26 of the panel structure 22B. Suitably, the threads 12 and the threads of the lower end portion 57 are of identical diameter and pitch, whereby the first member 10B may be threadingly inserted into the panel 22 and the supporting structure 56 at the same rate. As may be seen from FIGS. 1, 3, and 5, the external portions of the first member first end portion 13, and the second member 35 do not project outwardly beyond the external surface 26 of the external panel 22, and the fastener thereby provides a smooth, substantially continuous external surface. When used to support an external vehicle skin member 22B, the apparatus provides a smooth, aerodynamically efficient outer surface 26. At the same time, the fastener first member 10B is readily removable, as has been described with reference to the first and second embodiments, without damage to the panel 22B.

Referring now to FIG. 6, a third embodiment of the fastener is installed in a receiving structure 20C comprising panels 22C, 23C, in which an internally threaded bore 21 is formed for receiving the first member 10C. Indentations 45C, 46C are preferably cut into the second panel member 23C for receiving the distal end portions 40, 41 of the second member 35, for locking the fastener first member 10C relative to the receiving structure 20C. The embodiment of FIG. 6 employs fewer components and is of lower manufacturing cost than those of the preceding embodiments and is suitable for use when the panel structures 22C, 23C are of a metal suitable for forming the internally threaded bore 21. In the embodiment of FIG. 6, the fastener may be directly inserted into the receiving member 20 from the external, accessible surface area 26.

In further embodiments, not shown, one leg only of the fastener, such as the left leg 36 of the embodiment of FIGS. 1 and 2, is employed for effecting locking engagement between the first member and the receiving structure. The means for effecting locking engagement preferably comprises a means for deforming the distal end portion of the elongated member for effective locking engagement with the first member and the receiving structure, such means preferably comprising the diverting ramp surface 32. Alternatively, a corresponding surface, not shown, may be formed on the receiving structure, diverging toward the first member 10, for urging the leg 36 toward and into engagement with corresponding slots or castellations formed on the first member. The method of providing such a first member having external threads adapted to engage internal threads on a receiving member, threadingly inserting the first member from an accessible surface area, and subsequently inserting a second member for interlocking the first member and the receiving member provides a convenient means for fastening the first member and the receiving structure without access to the opposite side surface. Removal of the second member from the accessable surface is readily accomplished by first inserting a sharp pick or the like under the medial portion of the second member, prying out the member, and then unscrewing the first member. Locking and unlocking of the members ia accomplished in accordance with the above description of the several illustrative embodiments.

From the above description and drawing it will now be understood that the present invention provides an improved blind fastener which is readily insertable and removable from a workpiece or panel in which only one, outer or exposed side is accessible to an operator. The fastener is particularly suited for insertion and removal from delicate or frangible workpieces, and is suitable for use in cyclical, high temperature environments. Very little torque is required for securing the fastener, and the workpiece is not damaged during insertion or removal of the fastener. As shown and described with respect to the embodiment of FIG. 5, the fastener is adapted for use as a stand-off or standard for positioning an outer panel in spaced relation to an inner structural member. It may be further adapted, by varying the relative pitch or the degree to which the upper and lower threads are inserted into the respective panels, for varying the spacing of the panel from the supporting structure.

While several embodiments and modifications of the fastener have been shown and described herein, it should be understood that various other embodiments and variations may be made without departing from the scope of the invention. Accordingly, it should be understood that the forms of the present invention described above and shown in the accompanying drawing are illustrative only and not intended to limit the scope of the invention defined in the accompanying claims.

What is claimed is:

1. A fastener apparatus comprising:

a first member having a cylindrical, externally threaded shaft having first and second elongated grooves formed thereon and extending along the shaft, the first member having first and second end portions; 'receiving structure having a first, outer surface area and a second surface area and having a threaded bore extending through the structure, communicating between the two surface areas, and adapted to receive the first member;

a second member having first and second legs and a medial portion, the first and second legs having respective distal and portions spaced from the medial portion, the first and second legs comprising means adapted to extend within respective ones of the elongated grooves and to engage the receiving structure upon the first member being threadingly engaged within the threaded bore, the medial portion comprising means adapted to extend across the first end portion of the first member;

wherein the receiving structure comprises a first structure, comprising a sleeve member, and a second structure, the first structure being connected to the second structure, and wherein the first member end portion is connected to a third, supporting structure and extends from the supporting structure to the receiving structure, the first member comprising means for maintaining the receiving structure in spaced relation to the third, supporting structure;

the first structure having external threads, the second structure having a threaded bore for receiving the first structure, the first structure comprising means for effecting adjustment of the spacing between the second structure and the third structure.

2. A fastener apparatus comprising: a first member having a cylindrical, externally threaded shaft having first and second elongated grooves formed thereon and extending along the shaft, the first member having first and second end portions;

a receiving structure having a first, outer surface area and a second surface area and having a threaded bore extending through the structure, communicating between the two surface areas, and adapted to receive the first member;

a second member having first and second legs and a medial portion, the first and second legs having respective distal end portions spaced from the medial portion, the first and second legs comprising means adapted to extend within respective ones of the elongated grooves and to engage the receiving structure upon the first member being threadingly engaged within the threaded bore, the medial portion comprising means adapted to extend across the first end portion of the first member;

wherein the receiving structure comprises a first structure comprising an internally threaded sleeve member having a flanged head and a second non-metallic structure defining the outer and the second surface areas, the sleeve flanged head being adapted to seat against the outer surface area, the receiving structure further comprising a grommet adapted to be connected to the sleeve member and having a flange adapted to seat against the second surface area, the first member having a first threaded portion adapted to engage the receiving structure and a second threaded portion spaced from the first, further comprising supporting structure having means for receiving the second threaded portion.

3. The apparatus of claim 2, wherein the first member comprises means extending perpendicularly from the second surface toward the supporting structure for supporting the receiving structure in spaced relationship from the supporting structure.

* * * * *